US005561647A

United States Patent [19]
Kayanuma

[11] Patent Number: 5,561,647
[45] Date of Patent: Oct. 1, 1996

[54] SYSTEM FOR DETECTION OF READOUT SIGNALS FROM OPTICAL DISC

[75] Inventor: Kinji Kayanuma, Tokyo, Japan

[73] Assignee: NEC Corporation, Tokyo, Japan

[21] Appl. No.: 363,942

[22] Filed: Dec. 27, 1994

[30] Foreign Application Priority Data

Dec. 27, 1993 [JP] Japan .................................. 5-330300

[51] Int. Cl.⁶ ..................................................... G11B 5/09
[52] U.S. Cl. ................................................ 369/48; 369/58
[58] Field of Search .................................. 369/47, 48, 49, 369/50, 54, 58, 59, 124; 360/45

[56] References Cited

U.S. PATENT DOCUMENTS 5,262,904  11/1993  Tang et al. .................................. 360/45
5,345,452   9/1994  Matsui ................................... 360/45 X Primary Examiner—Georgia Y. Epps
Assistant Examiner—P. W. Huber
Attorney, Agent, or Firm—Sughrue, Mion, Zinn, Macpeak & Seas

[57] ABSTRACT

An equalizer is controlled to equalize a signal read from an optical disc. The equalized signal is supplied to a maximum-likelihood sequence detection circuit, in which a signal sequence is detected to be most coincident to the equalized signal among signal sequences meeting a state transition regularity. The equalizer operates for equalization, only when an error signal is detected in the vicinity of the end of a region having a code transition interval of more than number of minimum transition interval.

3 Claims, 6 Drawing Sheets

SYSTEM FOR DETECTION OF READOUT SIGNALS FROM OPTICAL DISC

FIELD OF THE INVENTION

The invention relates to a system for detection of readout signals from an optical disc and more particularly to a signal detecting system well adapted to high density storage of information in an optical disc by using runlength-limited codes.

BACKGROUND OF THE INVENTION

The compensation of intersymbol interference in a recording system is carried out in an optical disc by providing an equalizer in a signal readout circuit, so that waveform distortion generated in a signal transmitted through the recording and readout system is removed. The equalizer is set to provide an output signal which is a readout signal having an appropriate partial-response (PR) equalizing property, so that a low error rate is obtained even in the high density storage.

In the partial-response equalization, an amount of intersymbol interference in a signal is appropriately controlled to limit an frequency band for signals in place of artificially making an amplitude-decision of a multiple-value. This is used to lower a noise power in a signal for the purpose of suppressing the occurrence of errors due to noise without emphasizing of unnecessary frequency components. In the partial-response equalization, when PR (1,1) equalization is used, a binary sequence is artificially equalized to be a three-level signal to reduce a required frequency band for signals by approximately half.

In the partial-response equalization, there is regularity for a multiple-level signal which is obtained by making an artificial decision of a multiple-value for a binary sequence. For instance, when PR (1,1) equalization is used, a signal equalized to be a three-level signal by +1, 0 and −1 has a sequence in which a readout amplitude is +1 or 0 immediately after a readout amplitude of +1 is obtained. Further, the minimum interval by which a readout amplitude of 0 is obtained is limited, when there is a limitation for the minimum intervals between transitions in recording codes.

In order to correct noise-caused errors in making decision of a multiple-level signal, a maximum-likelihood (ML) sequence detection system in which the above described regularity is used for constraint condition is used to select a signal sequence which is most coincident to a readout signal from signal sequences meeting the constraint condition. For this purpose, the Viterbi algorithm is used. The detection method which is obtained by combining the partial-response equalization and the maximum-likelihood sequence detection system is called PRML (partial-response maximum-likelihood). The PRML system will be explained in detail later.

In an optical recording or a magneto-optical recording, generally, the storage of information is realized by changing a pit configuration formed on a recording medium, or changing the direction of magnetization on a recording medium. As a result, non-linearity is generated in input and output characteristics, under the high recording density.

In a conventional equalizer, there is a disadvantage in that non-linear distortion is not removed from a signal, because it is composed of linearly operating elements such as delay circuits, coefficient-multipliers, and adders (to be explained in detail later). Therefore, when ordinary coefficient controlling procedures are adopted, an equalizing power is remarkably reduced due to the influence of nonlinearity. When distortion depending on a signal sequence is mixed as noise into an equalized signal, the distortion component prevents a maximum-likelihood sequence detection from being carried out in a normal manner to deteriorate detection characteristics.

SUMMARY OF THE INVENTION

Accordingly, it is an object of the invention to provide a system for detection of readout signals from an optical disc in which the influence of non-linear distortion is removed.

It is a further object of the invention to provide a system for detection of readout signals from an optical disc in which the storage of information is carried out with high density.

According to the invention, a system for detection of readout signals from an optical disc, comprises:

an optical disc for storing information in accordance with runlength-limited codes having a predetermined number no less than two of minimum intervals of transition;

an optical head for reading a signal from the optical disc;

an equalizer for equalizing the signal read from the optical disc;

a maximum-likelihood sequence detection circuit for detecting a signal sequence to be supplied to an output terminal, the signal sequence being most coincident to the signal equalized in the equalizer to be selected from signal sequences meeting a predetermined state transition regularity; and a controller for controlling the equalizer to equalize the signal read from the optical disc, only when an error signal is detected in a vicinity of an end of a region having a code transition interval of more than a predetermined number.

BRIEF DESCRIPTION OF THE DRAWINGS

The invention will be explained in more detail in conjunction with appended drawings, wherein.

DESCRIPTION OF THE PREFERRED EMBODIMENTS

Before explaining a system for detection of readout signals from an optical disc in the preferred embodiments according to the invention, the aforementioned conventional system for detection of readout signals from an optical disc will be explained in FIGS. 1 and 2.

Figure 1:
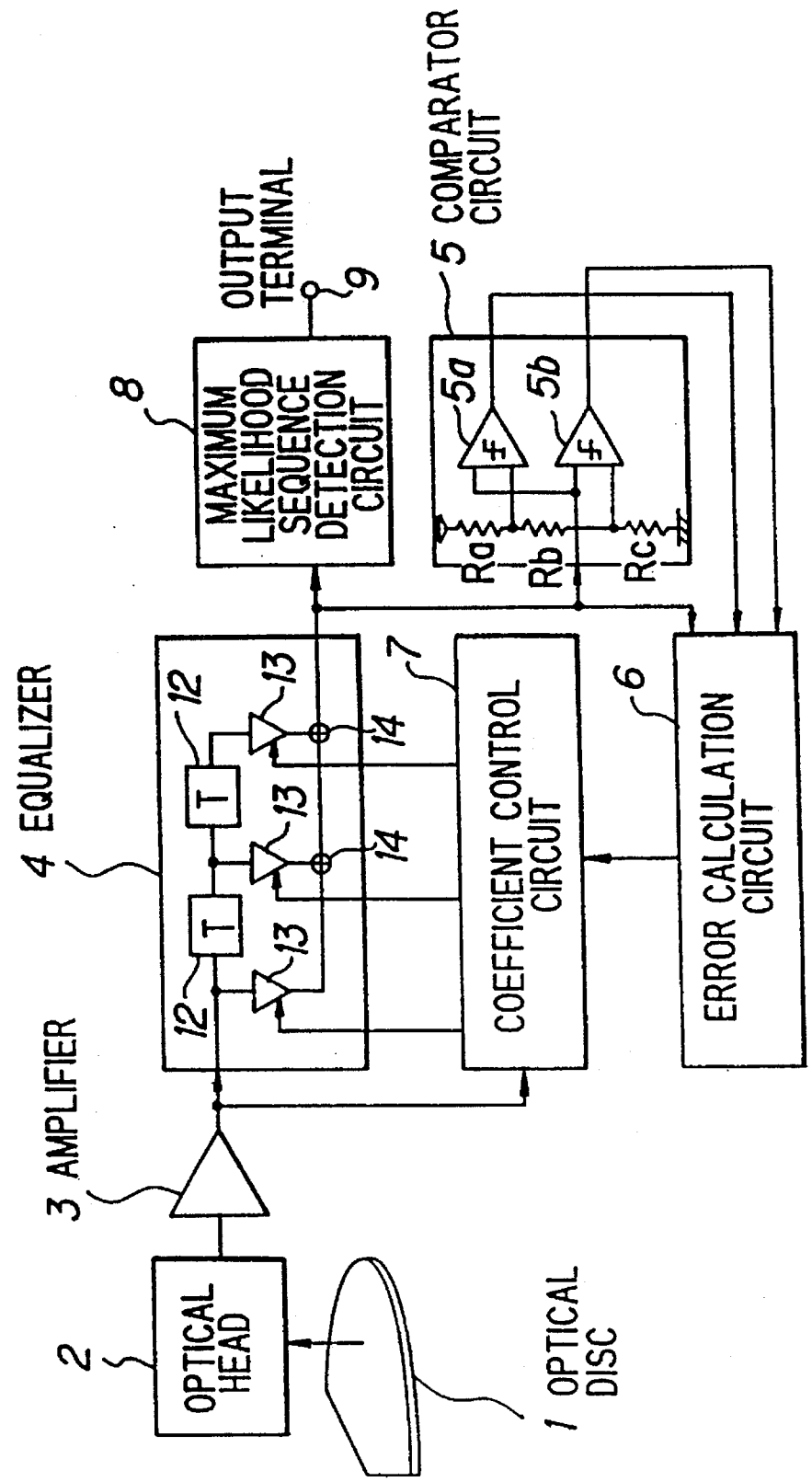
FIG. 1 is a block diagram showing a conventional system for detection of readout signals from an optical disc.

FIGS. 1 shows the conventional system for reproduction of signals from an optical disc using PRML which comprises an optical disc 1, an optical head 2, an amplifier 3, an equalizer 4, a comparator circuit 5, an error calculation circuit 6, a coefficient control circuit 7, and a maximum-likelihood sequence detection circuit.

In the conventional system for detection of readout signals from an optical disc, a reproduced signal read from the optical disc 1 by the optical head 2 is supplied via the amplifier 3 to the equalizer 4 comprising delay circuits 12, multipliers 13 and adders 14, in which an amplified signal is equalized by PR (1,1). An output signal of the equalizer 4 is supplied to the maximum-likelihood sequence detection circuit. 8, the comparator circuit 5, and the error calculation circuit 6.

The comparator circuit 5 comprises first and second comparators 5a and 5b connected at reference input terminals to nodal points of threshold setting resistors Ra, Rb and Rc, so that the output signal supplied to signal input terminals of the first and second comparators 5a and 5b is determined to be one of three-level signals +1, 0, and −1. The output signals of the comparator circuit 5 is supplied to the error calculation circuit 6, in which a difference between the output signal of the equalizer 4 and a reference level corresponding to the output signal of the comparator circuit 5 is calculated to generate an equalizing error signal which is supplied to the coefficient control circuit 7. In the coefficient control circuit 7, coefficients to be supplied to the multipliers 13 in the equalizer 4 are controlled in accordance with correlation between the input signal of the equalizer 4 and the equalizing error.

Figure 4:
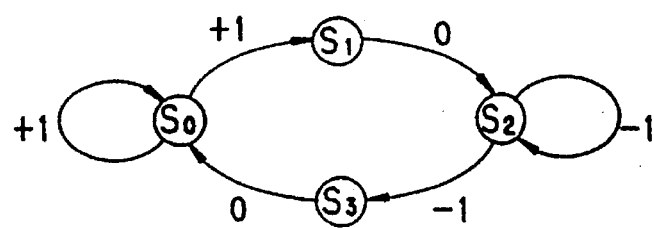
FIG. 4 is an explanatory diagram explaining constraint condition in a maximum-likelihood sequence detection circuit: in the first preferred embodiment.

In the maximum-likelihood sequence detection circuit 8, a signal sequence which is most coincident to the output signal of the equalizer 4 among all signal sequences meeting regularity of the state transition as shown in FIG. 4 (to be discussed later).

In case of using such a maximum-likelihood sequence detection circuit, there is an advantage in that the probability of generating detection errors due to noise component can be reduced, because transition condition on which amplitudes of reproduced signals are determined is limited. For instance, an error in which a signal sequence has a code inversion interval of 1 does not occur, because the maximum-likelihood sequence detection circuit has constraint condition on which the minimum code transition interval is 2.

The system described above is highly effective in case of a readout signal having linear distortion. Waveform distortion composed of only linear distortion is effectively removed from a readout signal by a transversal filter. In such a case, amplitudes of signals supplied from the equalizer 4 range in the vicinity of the multiple-level. As a result, the maximum-likelihood sequence detection circuit 8 operates effectively. On the other hand, when an optical disc into which information is thermally stored by using laser beams is used, overlapping portion s are formed on adjacent recording pits 20 as shown in FIG. 2 by hatching. As a result, a readout signal will not be an amplitude indicated by a dotted line 23 which is formed by superposing readout signals 21 for each pit 20, but an amplitude indicated by a solid lien 22. Non-linear distortion included in the reproduced signal is not removed by a transversal filter. The residual non-linear distortion is largely influenced by signal sequences, so that the maximum-likelihood sequence detection circuit 8 does not operate correctly.

Figure 3:
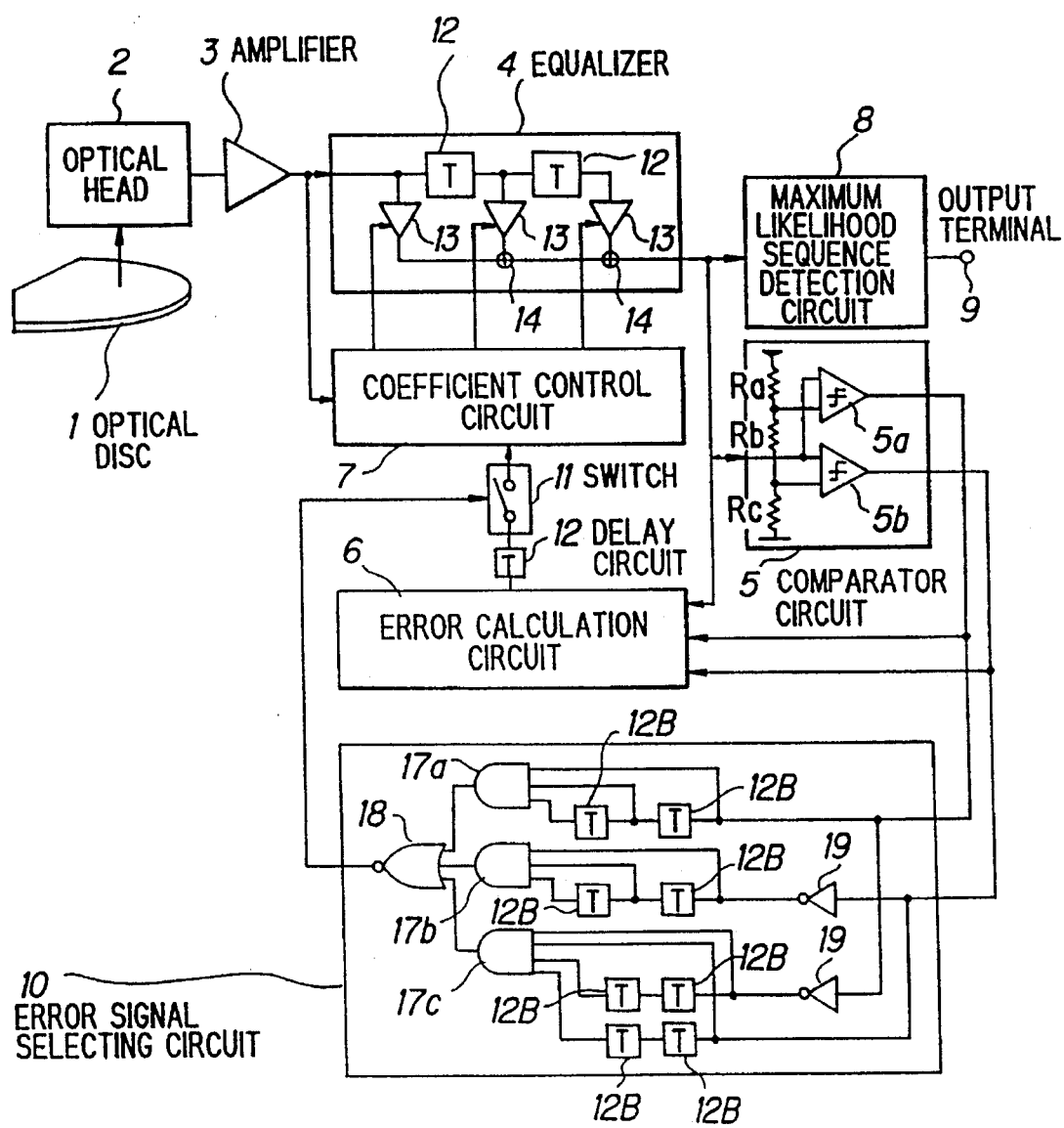
FIG. 3 is a block diagram showing a system for detection of readout signals from an optical disc in a first preferred embodiment according to the invention.

Next, a system for detection of readout signals from an optical head in the first preferred embodiment will be explained in FIG. 3, wherein like parts are indicated by like reference numerals as used in FIG. 1.

In the system for detection of readout signals from an optical head, there are further provided an error signal selecting circuit 10, a switch 11, and a delay circuit 12, wherein the error signal selecting circuit 10 comprises NOT circuits 19, delay circuits 12B, AND circuits 17a, 17b and 17c and a NOR circuit 18, and the switch 11 is connected via the delay circuit 12A to the error calculation circuit 6, and directly to the coefficient control circuit 7.

In operation, a readout signal read from the optical disc 1 by the optical head 2 is supplied via the amplifier 3 to the equalizer 4. In the comparator circuit 5, threshold values are set to be +½, and −½ by the resistors Ra, Rb and Rc. When the output signal of the equalizer 4 is greater in amplitude than +½, the comparators 5a and 5b provide high output signals representing a decision value of +1, when it is less in amplitude than +½ and greater in amplitude than −½, the comparator 5a provides a low output signal and the comparator 5b provides a high output signal, thereby representing a decision value of 0, and, when it is less in amplitude than −½, the comparators 5a and 5b provide low output signals representing a decision value of −1. Then, the error calculation circuit 6 calculates a difference between the output signal of the equalizer 4 and one reference level of reference levels +1, 0 and −1 corresponding to the decision values.

On the other hand, the error signal selecting circuit 10 detects whether the output signal of the equalizer 4 is data to be equalizer or not in accordance with an output signal of the comparator circuit 5, wherein the AND circuits 17a, 17b and 17c detect a region of consecutive +1s, a region of consecutive −1s, and a region sandwiched by two 0s, and the NOR circuit 18 provides a high output signal to turn the switch 11 on, when the above three regions are not detected. When the switch 11 is turned on, an error signal supplied from the error calculation signal 6 is delayed in the delay circuit 12A to compensate a delay in the error signal selecting circuit 10.

Consequently, an error signal supplied to the coefficient control circuit 7 is one corresponding to the vicinity of an end for a region in which a code inversion interval is equal to or more than 3. This means that an error signal for a region of a signal sequence having a code inversion interval of 2 is not supplied to the error control circuit 7, so that an amplitude of this region is not equalized to ±1. Further, the regions for the same consecutive codes are also excluded from equalization not to apply an amplitude of ±1 thereto.

As described above, an equalized region is limited to control the coefficients. Thus, the coefficient values function as minimizing an error of a region included in equalization.

FIG. 4 shows how a readout signal makes transition, when codes having a minimum code inversion interval of 2 are equalized by PR (1,1) wherein $S_0$ to $S_3$ indicate states which are fixed dependent on immediately prior signal sequences, and figures on and blow arrows indicate reproduced levels. As understood from the illustration, 0s do not follow consecutively, and −1 is not generated after +1.

Figure 5A:
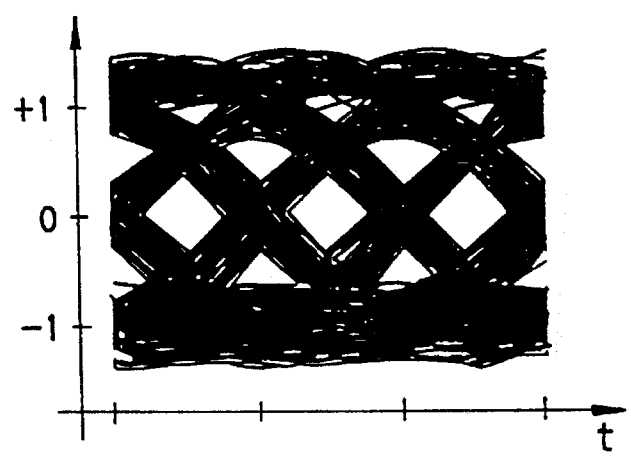
FIGS. 5A and 5B are explanatory diagrams explaining operation of an equalizer in the first preferred embodiment.
Figure 5B:
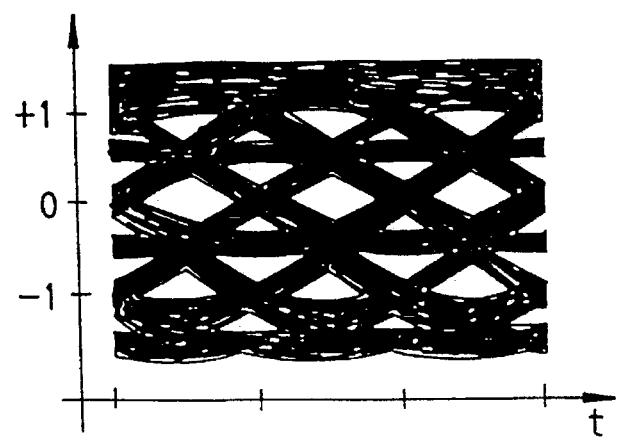

FIG. 5A shows an eye pattern for an output signal of the equalizer 4 in the conventional system, and FIG. 5B shows an eye pattern for an output signal of the equalizer 4 in the system in the first preferred embodiment, wherein a signal amplitude corresponding to a signal sequence having a code inversion interval of 2 is less than ±1, and a signal amplitude for a region of a larger code inversion internal is outside ±1. Further, a signal dispersion for a region equalized to reference amplitudes ±1 and 0 is small, and a noise component is decreased as compared to the equalized waveforms as shown in FIG. 5A.

The equalized signal is supplied to the maximum-likelihood sequence detection circuit 8, in which a maximum-likelihood signal sequence is detected on the constraint condition that the minimum code transition interval is 2. The maximum-likelihood sequence detection circuit 8 is a conventional one, in which a signal sequence which is most coincident to the equalized signal is selected among signal sequences generated in the state transition diagram as shown in FIG. 4. This is described, for instance, by G. D. Forney, "The Viterbi Algorithm", Proceedings of the IEEE, Vol. 61, No. 3, March 1973, pp. 268–278, and by G. Ungerböck, "Adaptive maximum-likelihood Receiver for Carrier-modulated Data Transmission System", IEEE Transactions on Communications, Vol. com-22, No. 5, May 1974, pp. 624–636. A reproduced signal having a code transition interval of 1 is not included in a candidate of detected data. Therefore, if readout signals having code transition intervals of 2 and 3 are discriminated from each other, data is precisely detected in the maximum-likelihood sequence detection circuit 8. Accordingly, it is not necessary that a readout signal amplitude corresponding to a code transition interval of 2 reaches ±1.

Figure 6:
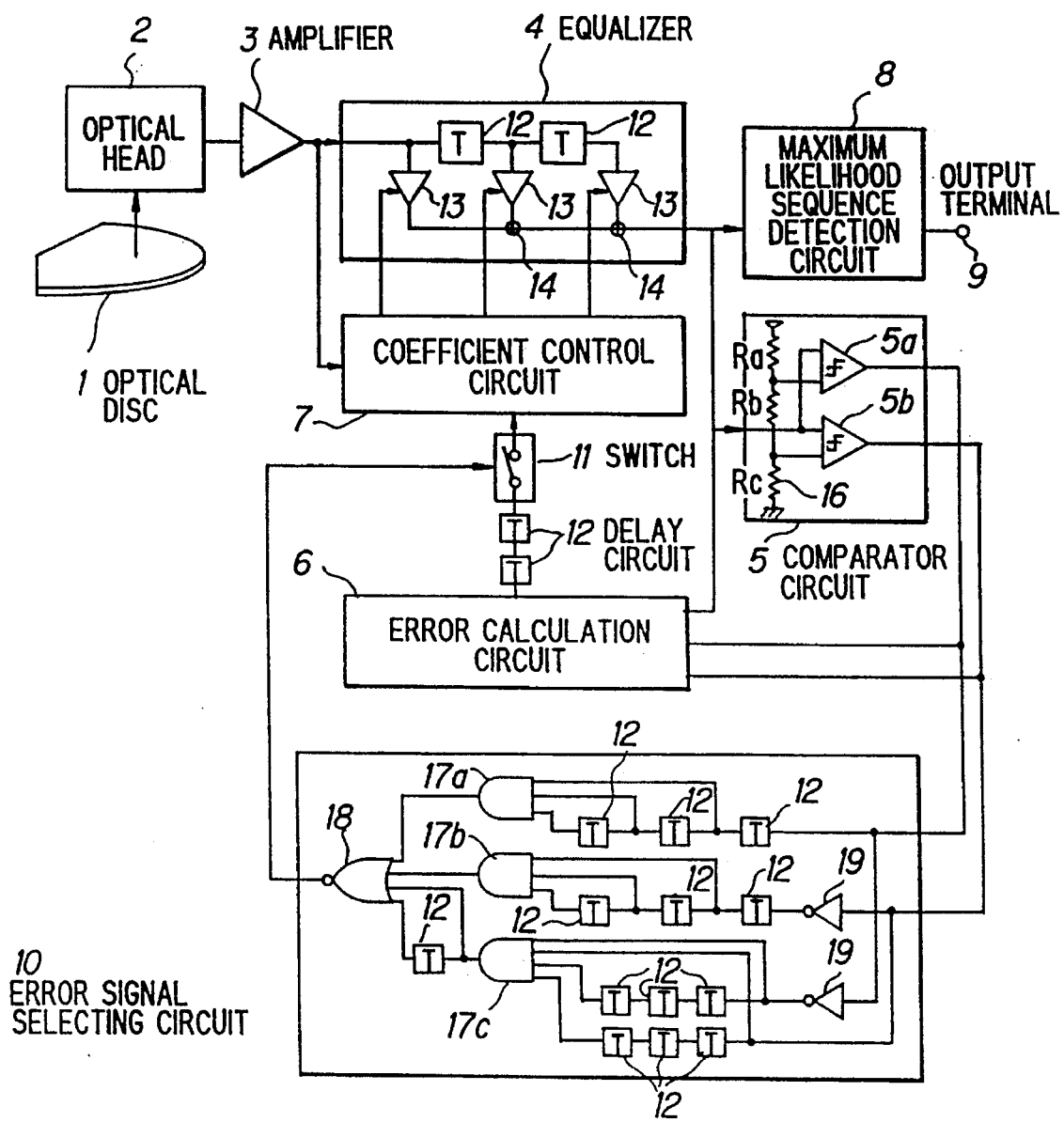
FIG. 6 is a block diagram showing a system for detection of readout signals from an optical disc in a second preferred embodiment according to the invention.

A system for detection of readout signals from an optical head in the second preferred embodiment will be explained in FIG. 6, wherein like parts are indicated by like reference numerals as used in the first preferred embodiment.

In the second preferred embodiment, the system is adapted to a signal sequence having a maximum code transition interval of 3, wherein the delay circuits 12A and 12B are provided to be increased in number as compared to those in the first preferred embodiment.

In operation, the error signal selecting circuit 10 detects regions to be equalized in the same manner as in the first preferred embodiment. That is, when a region having consecutive amplitudes of +1s, a region having consecutive amplitudes of −1s, and a region corresponding to a signal sequence having the minimum code transition interval are detected, the switch 11 is turned on. As a result, the region corresponding to a signal sequence having the code inversion interval of 3 and the same code consecutive regions are excluded from regions to be equalized.

Figure 7:
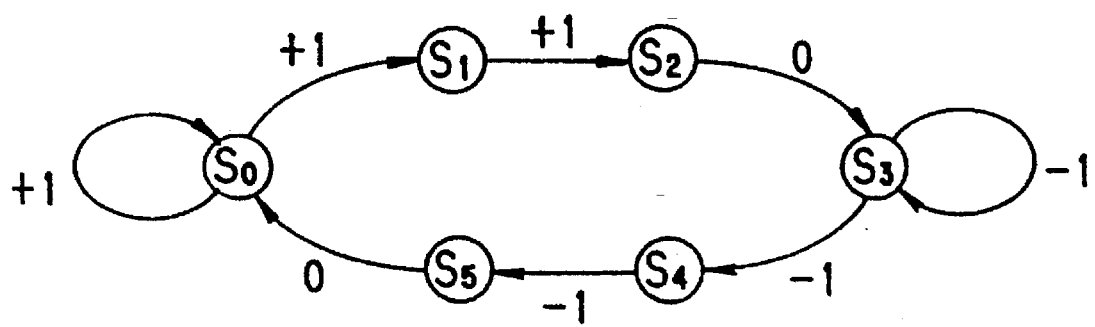
FIG. 7 is an explanatory diagram explaining constraint condition in a maximum-likelihood sequence detection circuit in the second preferred embodiment.

The maximum-likelihood sequence detection circuit 8 is structured on the basis of the state transition diagram as shown in FIG. 7 to operate on the constraint condition that the minimum code transition interval is 3. Accordingly, readout signals having the code transition intervals of 1 and 2 are not included in a candidate of data to be detected. As shown in FIG. 7, the readout signal amplitudes of +1 and −1 are consecutively obtained at least two times, and an amplitude having a code opposite to a prior code is generated immediately after 0.

In the second preferred embodiment, regions to be equalized are limited not to equalize a readout signal amplitude having the code transition interval of 3 to ±1, and, when code transition intervals of 3 and 4 are discriminated from each other, data is precisely detected in accordance with the limitation of the state transition.

In the first and second preferred embodiments, the equalizer is an adaptative equalizer using multiplying coefficients to be controlled by the coefficient control circuit. When the adaptative equalizer is replaced by an equalizer using constant coefficients, the system in the preferred embodiments can be used to determine values of the constant coefficients in advance. When the coefficients are determined to equalize to three-level signal only regions prior to and after code transition excluding regions corresponding to a minimum code transition interval in case of using run-length limitation codes, the influence of non-linearity and noise is reduced for readout signals.

When a circuit for forcedly forming a zero point is used together with an adaptative filter as described in the Japanese Patent Application No. 4-210909, a converging speed is increased at high density storage to provide a low error rate in a short time. There is a zero point at a frequency corresponding to a half of a channel bit rate in a PR (1,1) equalized signal. Therefore, a converging speed is prevented from being lowered by forcedly forming a zero point for input and output characteristics of an equalizer.

Figure 2:
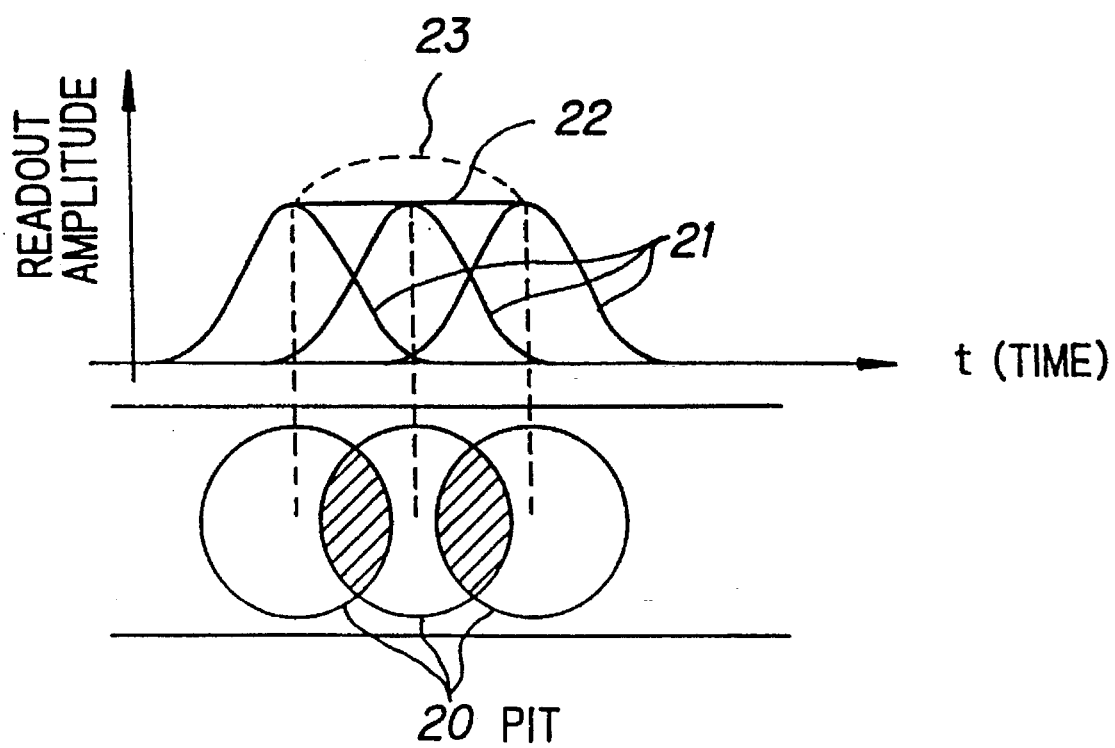
FIG. 2 is an explanatory diagram explaining the cause of generating non-linear distortion in the conventional system.

As explained before, non-linear distortion occurring in a digital recording system for an optical disc is caused by overlapping of recording pits as shown in FIG. 2. Therefore, it occurs typically in case of forming the same consecutive codes. On the other hand, it is more difficult to specify an transition position of codes in case where the codes are inverted than to make a decision in case where the same codes follow consecutively, when amplitudes of the codes are decided, so that the influence due to bit shift caused by intersymbol interference tends to occur.

In the invention, only a region which is in the vicinity of an transition position of codes and which is less affected by non-linear distortion is subject to the three-level equalization. Further, when the maximum-likelihood sequence detection is carried out by using condition in which a minimum intervals between transitions is limited, a readout signal sequence having the minimum intervals between transitions is subject to the maximum-likelihood sequence detection to provide precise amplitude decision, even if it is less than a reference amplitude of the three-level, so that it is excluded from a signal sequence to be equalized. As a result, input of noise to a maximum-likelihood sequence detection circuit is suppressed without emphasizing a high frequency component of a readout signal unnecessarily to provide improved detection characteristics.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A system for detection of readout signals from an optical disc, comprising:

an optical disc for storing information in accordance with runlength-limited codes having a predetermined number no less than two of minimum intervals of transition;

an optical head for reading a signal from said optical disc;

an equalizer for equalizing said signal read from said optical disc;

a maximum-likelihood sequence detection circuit for detecting a signal sequence to be supplied to an output terminal, said signal sequence being most coincident to said signal equalized in said equalizer to be selected from signal sequences meeting a predetermined state transition regularity; and a controller for controlling said equalizer to equalize said signal read from said optical disc, only when an error signal is detected in a vicinity of an end of a region having a code transition interval of more than said predetermined number.

2. The system as defined in claim 1, wherein:

said controller, comprises:

a decision circuit for providing a multiple-level signal by making an amplitude decision of said equalized signal;

an error calculation circuit for providing an error signal by comparing said equalized signal and said multiple-level signal;

an error signal selecting circuit for providing an error signal selecting signal by detecting said vicinity of said end of said region having said code transition interval of more than said predetermined number in accordance with said multiple-level signal;

a coefficient control circuit for supplying coefficients for equalization to said equalizer by receiving said error signal from said error calculation circuit; and a switch circuit for interrupting a supply of said error signal from said error calculation circuit to said coefficient control circuit by receiving said error signal selecting signal, when said vicinity of said end of said region is not detected.

3. The apparatus as defined in claim 2, wherein:

said error signal selecting circuit, comprises:

A first circuit for detecting a region having consecutive codes of +1s;

a second circuit for detecting a region having consecutive codes of −1;

a third circuit for detecting region sandwiched by 0s; and a NOR circuit for providing said error signal selecting signal by receiving output signals of said first to third circuits.

* * * * *